United States Patent [19]
Woodside et al.

[11] Patent Number: 6,089,300
[45] Date of Patent: *Jul. 18, 2000

[54] PROTECTIVE COVERINGS

[75] Inventors: Margaret Mary Woodside, Pickerington; Frank Joseph Macdonald, Granville, both of Ohio; Scott Alan Calvert, Louisville, Ky.; Joseph Martine Lehman, Columbus, Ohio

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,019

[22] Filed: Aug. 26, 1997

Related U.S. Application Data

[63] Continuation-in-part of application No. 08/778,942, Jan. 6, 1997.

[51] Int. Cl.$^7$ ....................................... E04F 10/10
[52] U.S. Cl. .............................. 160/37; 160/202; 160/222
[58] Field of Search .............................. 160/202, 37, 201, 160/222, 23.1; 52/202; 49/62, 464

[56] References Cited

U.S. PATENT DOCUMENTS

| | | |
|---|---|---|
| 335,960 | 2/1886 | Reaser . |
| 771,078 | 9/1904 | Landis . |
| 805,210 | 11/1905 | Landis . |
| 1,095,826 | 5/1914 | Dewitt . |
| 1,648,851 | 11/1927 | Lapin ...................................... 160/202 |
| 2,136,854 | 11/1938 | Knott . |
| 3,158,909 | 12/1964 | Downs . |
| 3,831,319 | 8/1974 | Warner . |
| 3,871,278 | 3/1975 | Shoemaker ............................. 160/213 |
| 4,068,699 | 1/1978 | Tucker .................................... 160/202 |
| 4,088,525 | 5/1978 | Gowetski et al. . |
| 4,175,357 | 11/1979 | Goldhaber . |
| 4,234,633 | 11/1980 | Gowetski et al. . |
| 4,294,302 | 10/1981 | Ricke, Sr. . |
| 4,333,271 | 6/1982 | Depaolo et al. ........................... 49/464 |
| 4,356,678 | 11/1982 | Andrews et al. . |
| 4,685,261 | 8/1987 | Seaquist . |
| 4,748,064 | 5/1988 | Harpell et al. . |
| 4,885,205 | 12/1989 | Wahl et al. . |
| 4,931,358 | 6/1990 | Wahl et al. . |
| 5,022,454 | 6/1991 | Kobayashi et al. ...................... 160/202 |
| 5,087,657 | 2/1992 | Qureshi et al. . |
| 5,165,746 | 11/1992 | Teigen ..................................... 160/201 |
| 5,185,117 | 2/1993 | Hawley . |
| 5,228,238 | 7/1993 | Fenkell . |
| 5,248,373 | 9/1993 | Minnick et al. . |
| 5,251,414 | 10/1993 | Duke . |
| 5,268,223 | 12/1993 | Qureshi et al. . |
| 5,347,775 | 9/1994 | Santos . |
| 5,353,563 | 10/1994 | White . |
| 5,443,563 | 8/1995 | Hindel et al. . |
| 5,457,921 | 10/1995 | Kostrzecha . |
| 5,487,243 | 1/1996 | Hale et al. . |
| 5,579,615 | 12/1996 | Hoffman . |
| 5,603,190 | 2/1997 | Sanford . |
| 5,626,643 | 5/1997 | Woodside et al. . |
| 5,636,679 | 6/1997 | Miller et al. ............................. 160/23.1 |
| 5,737,874 | 4/1998 | Sipos et al. . |
| 5,789,078 | 8/1998 | Eikleberry et al. . |

OTHER PUBLICATIONS

"The Long And Short Of Fiber–Reinforced Thermoplastics," *Advanced Materials*.

McConnell, "Metal Replacements," *Plastics Design Forum*, Nov./Dec., 1989, pp. 35–37, 42 and 48.

Wenger et al., Ädvancements In Glass Reinforced Thermoplastics—The Long And Short Story.

*Primary Examiner*—Blair M. Johnson
*Attorney, Agent, or Firm*—Inger H. Eckert

[57] ABSTRACT

Protective coverings are provided for glass windows and the like. The protective coverings comprise impact and puncture resistant protective panels formed from strand material which includes reinforcing fibers and polymeric material.

11 Claims, 13 Drawing Sheets

PROTECTIVE COVERINGS

CROSS REFERENCE TO RELATED APPLICATIONS

This application is a continuation-in-part application of U.S. patent application Ser. No. 08/778,942, titled "IMPACT AND PUNCTURE RESISTANT PANELS," by Margaret M. Woodside et al., filed on Jan. 6, 1997, herein incorporated by reference, and is related to contemporaneously filed U.S. patent application Ser. No. 08/920,066, titled "PROTECTIVE COVERINGS," by Margaret M. Woodside et al., herein incorporated by reference.

TECHNICAL FIELD AND INDUSTRIAL APPLICABILITY OF THE INVENTION

The present invention relates to protective coverings for glass windows and the like and, more particularly, to protective coverings comprising impact and puncture resistant protective panels formed from strand material which includes reinforcing fibers and polymeric material.

BACKGROUND OF THE INVENTION

Impact and puncture resistant panels are useful in many applications, including as protective coverings for cash windows of financial institutions, coverings for kiosks and carts in open areas of shopping malls, side panels for tractor trailers, boat hulls, aircraft parts and other articles and parts for which impact resistance and/or puncture resistance are desired. By way of example only, the prior use of such panels as shutters or window covers shall now be described. Buildings and houses located in areas prone to severe weather conditions, such as hurricanes and tornados, are often exposed to wind borne debris during those severe weather conditions. Windows and doors, especially those made of glass, are most vulnerable to wind borne debris, such as tree branches, rocks and portions of surrounding structures.

Shutters made of aluminum and steel are currently used to protect vulnerable portions of buildings and houses since shutters made from these materials can be manufactured to meet building and housing codes in regions which experience severe weather conditions. However, steel and even aluminum shutters undergo pitting and strength degradation associated with corrosion, particularly in regions along the sea coast, where the air contains a high concentration of corrosive salt. In addition, metal shutters can be somewhat heavy.

Accordingly, there is a particular need for protective coverings which can prevent the penetration of wind borne debris during severe weather conditions, are corrosion resistant and are relatively lightweight. There is also a more general need for protective coverings that are relatively inexpensive to produce and readily adapted to various applications and strength requirements.

SUMMARY OF THE INVENTION

The present invention satisfies the current needs in the art by providing protective coverings comprised of fiber reinforced polymeric matrix panels which are relatively resistant to penetration by wind borne debris, inexpensive, corrosion resistant and lightweight.

In accordance with a first aspect of the present invention, a shutter assembly is provided for protecting at least a portion of a structural element such as a window of a house or like structure. The shutter assembly comprises at least one container positioned adjacent to the structural element to be protected and at least one protective panel which is capable of being stored in the container. The container has a slot. The panel is movable through the slot from a stored position to a position at least partially covering the structural element.

Preferably, first and second containers are positioned on opposing sides of the structural element. The first container has a first slot along a side portion adjacent to the structural element and the second container has a second slot along a side portion adjacent to the structural element.

Each of the first and second containers preferably includes an opening along a front portion thereof. The front portion extends substantially transversely to the side portion.

The first container is capable of storing a plurality of first protective panels and the second container is capable of storing a plurality of second protective panels. The first protective panels are movable through the first slot so as to cover a first section of the structural element and the second protective panels are movable through the second slot so as cover a second section of the structural element.

Each of the first and second protective panels preferably comprises a fiber reinforced polymeric matrix panel.

The first and second protective panels may be provided with flanges along their opposing side edges such that flanges on adjacent protective panels are capable of interconnecting with one another.

The shutter assembly may further include first and second guide tracks extending between the first and second containers in mutually facing parallel relation. The guide tracks are adapted to receive and support the first and second protective panels when the first and second protective panels are moved out from the first and second containers. Each of the first and second protective panels is preferably provided with at least one upper lug and at least one lower lug which are adapted to be received in corresponding channels formed in the first and second guide tracks.

The shutter assembly preferably further includes first and second front panels which are positioned respectively in the first and second containers. The front panels engage the outermost ones of the first and second protective panels in the first and second containers.

The first container preferably further includes upper and lower first spring assemblies. Each of the first assemblies comprises a first cable having first and second ends, a second cable having third and fourth ends, first and second rollers and a tension spring. The first end of the first cable is connected to the first front panel and the second end is connected to a first end of the tension spring. The third end of the second cable is connected to the first front panel and the fourth end is connected to a second end of the tension spring. The first cable extends about the first roller and the second cable extends about the second roller.

In accordance with a second aspect of the present invention, a protective covering is provided for protecting at least a portion of an element secured in a structure. The protective covering comprises a first mounting member secured to the structure adjacent to the element; a second mounting member secured to the structure adjacent to the element; and at least one protective panel having a first portion which is adapted to releasably engage the first mounting member and one or more locking mechanisms which are capable of releasably securing the panel to the second mounting member.

The second mounting member preferably includes a locking flange.

Preferably, each of the one or more locking mechanisms comprises a latch mechanism. The latch mechanism includes a housing portion and a latch portion pivotably mounted to the housing portion. The latch portion includes a pull ring and a pawl fixedly coupled to the pull ring. The pawl is adapted to engage the locking flange to secure the panel in position adjacent to the element when the pull ring is positioned in a first position. The pawl disengages the locking flange when the pull ring is pivotably moved to a second position so as to allow the panel to be removed from the first and second mounting members.

The first mounting member may comprise first and second legs and a base which is coupled to the legs. The legs and the base define a C-shaped channel which is adapted to receive the first portion of the protective panel. The first leg includes a recess provided with a gasket which is adapted to engage the first panel portion such that the first panel portion is frictionally held in the first mounting member by the gasket and the second leg.

The objectives, features and advantages of the present invention will become apparent upon consideration of the following detailed description, accompanying drawings and appended claims.

DETAILED DESCRIPTION AND PREFERRED EMBODIMENTS OF THE INVENTION

Figure 1:
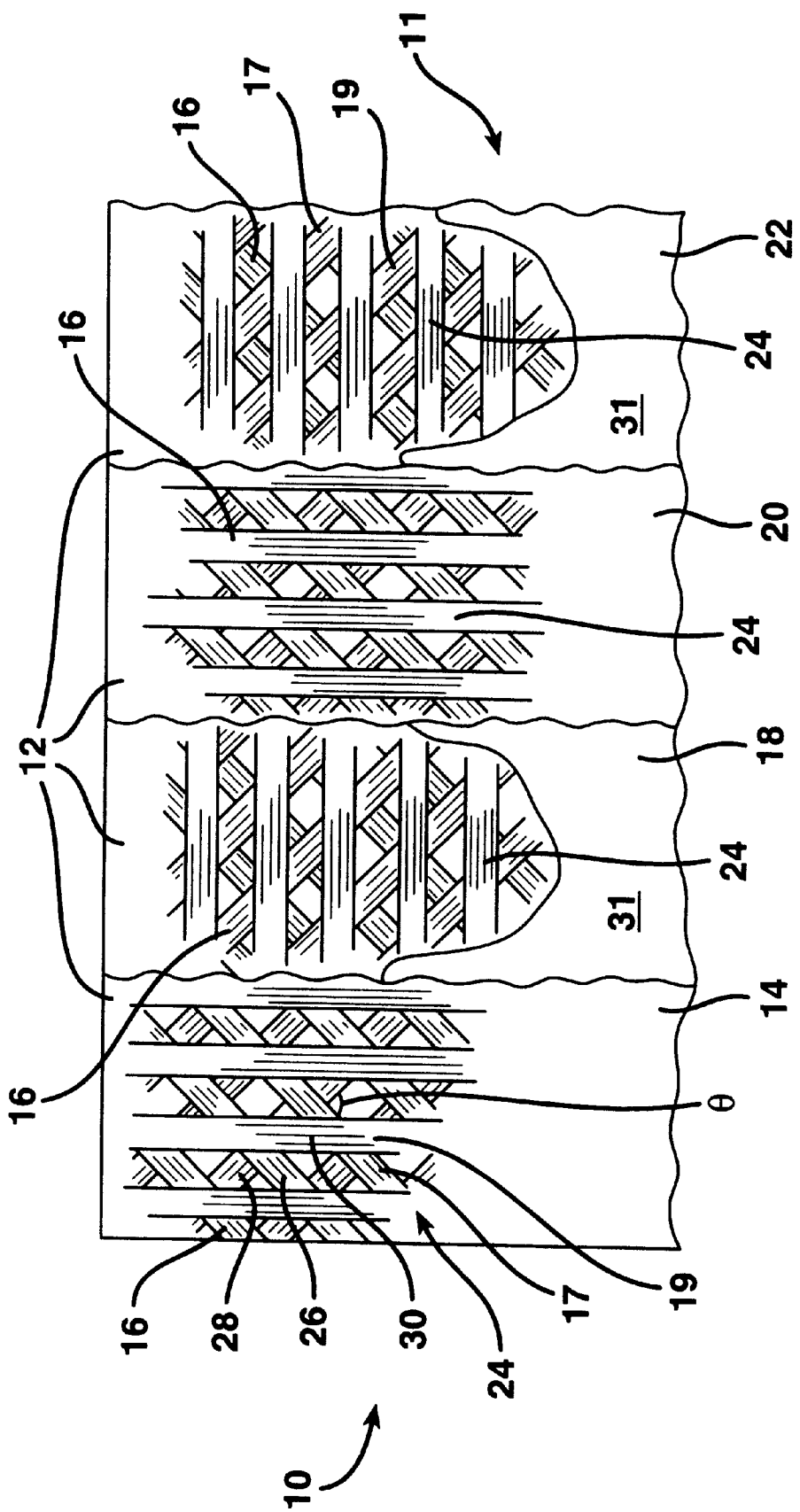
FIG. 1 presents a cutaway view showing the laminae of a panel formed according to one embodiment of this invention.

The present invention is directed to an impact and puncture resistant panel 10. The present panel 10 is a lamination of a plurality of laminae 12, each of which is formed from a plurality of reinforcement strands 16. Each strand 16 includes a plurality of reinforcing fibers 17 and at least one polymeric material 19. Useful reinforcing fibers can be any suitable reinforcing fiber including those selected from the group consisting of E-glass fibers, S-glass fibers, graphite fibers, aramid fibers, silicon carbide fibers, other fibers having suitable reinforcing characteristics and various combinations thereof. The polymeric material 19 can be any suitable polymeric material including a thermoplastic polymeric material selected from the group consisting of polyamides, polypropylenes, polyesters, polyethylenes, polyphenylene sulfides and other like thermoplastic materials.

The polymeric material 19 may be in the form of polymeric fibers which are commingled or combined with one or more reinforcing fibers 17 to form the strands 16. Methods for making commingled reinforcing and polymer fiber strands are disclosed in detail in U.S. Pat. No. 5,626,643, entitled "CONTACT DRYING OF FIBERS TO FORM COMPOSITE STRANDS," by Andrew B. Woodside et al. The applicants hereby incorporate by reference the '643 patent in its entirety. If commingled reinforcing-polymer fibers are used, it is desirable, though not required, for the weight ratio of reinforcing fibers to polymer fibers to range from about 40/60 to about 60/40. It can be more desirable for the weight ratio of reinforcing fibers to polymer fibers to be about 50:50.

Alternatively, the strands 16 may comprise a plurality of the reinforcing fibers 17 with the polymeric material 19 wire-coating or otherwise forming a layer around the reinforcing fibers 17 of each strand 16. These coated strands 16 may also include fibers made of the polymeric material 19 that are commingled with the reinforcing fibers 17. In addition, it may be desirable to use any combination of the above described strands 16 in making a panel 10 according to the present invention. Examples of such strands 16 are disclosed in copending U.S. patent application Ser. No. 08/695,909, filed Aug. 12, 1996, and entitled "CHEMICAL TREATMENTS FOR FIBERS AND WIRE-COATED COMPOSITE STRANDS FOR MOLDING FIBER-REINFORCED THERMOPLASTIC COMPOSITE ARTICLES," by Andrew B. Woodside, and in copending U.S. patent application Ser. No. 08/695,504, filed Aug. 12, 1996, and entitled "CHEMICAL TREATMENTS FOR FIBERS AND WIRE-COATED COMPOSITE STRANDS FOR MOLDING FIBER-REINFORCED THERMOPLASTIC COMPOSITE ARTICLES," by Andrew B. Woodside, the disclosures of which are hereby incorporated by reference.

Whether the strands 16 are formed by wire coating, commingling reinforcing and polymer fibers, or a combination thereof, it may or may not be desirable for the resulting strands 16 to be sized, impregnated or preimpregnated with a suitable chemical treatment. The cohesiveness of the fibers forming each of the strands 16 may be maintained by means of a suitable aqueous, nonaqueous, or solvent free chemical treatment. The chemical treatment can be applied so as to size the fibers before they are formed into a strand 16. However, to insure the cohesiveness of the fibers, it is desirable for the chemical treatment to be applied to the fibers in a sufficient amount to also at least partially, if not fully, preimpregnate the resulting strand 16. As an alternative, the chemical treatment can be partially or fully impregnated into a formed strand 16.

One chemical treatment that has been applied to maintain the cohesiveness of the fibers in the strand 16 is an aqueous based urethane chemical treatment available from Reichhold Chemicals of Raleigh-Durham, N.C., under the product identification number 97903. Another chemical treatment that has been used with the strands 16 is a non-aqueous based polyester chemical treatment. This polyester chemical treatment a polyester resin available from Alpha/Owens-Corning of Collierville, Tenn., under the product identification number E830. To produce this polyester chemical treatment, 1% by weight of benzoyl peroxide powder is mixed into 5% by weight styrene. This styrene/benzoyl peroxide mixture is then mixed with 2% by weight of the silane gamma-methacryloxypropyltrimethoxysilane (A174), available from Witco Chemical Company of Chicago, Ill., and 92 k by weight of the polyester resin E830.

For the present panels 10, a suitable chemical treatment is one which is compatible with the polymeric material 19. In general, for a composite article to exhibit satisfactory mechanical properties between its reinforcing fibers and matrix material, it is desirable for any chemical treatment applied to the reinforcing fibers to be compatible with the matrix material. Likewise, for the panel 10, it is desirable for any chemical treatment being used in the strands 16 to be compatible with the polymeric material 19, which forms at least part of the matrix for the reinforcing fibers 17 of each panel 10. In general, a chemical treatment is considered compatible with the polymeric material if it is capable of interacting with and/or reacting with the polymeric material. In addition, a chemical treatment can be considered compatible if stress loads (static or dynamic), applied to a panel 10 formed using such a chemical treatment, are transferable from the polymeric material 19 to the reinforcing fibers 17 or from the fibers 17 to the polymeric material 19 through the chemical treatment formed as an interface therebetween. The applied chemical treatment may comprise the same type of material as the polymeric material. In addition, the compatible chemical treatments may be miscible in the polymeric material, in whole or in part, and/or may form a separate phase from the polymeric material.

Referring to FIG. 1, one embodiment 11 of the panel 10 comprises a plurality of laminae 12, four of which are shown in FIG. 1 for illustration purposes. The panel 11 includes a first lamina 14, a second lamina 18, a third lamina 20 and a fourth lamina 22. Each lamina 14, 18, 20 and 22 comprises a plurality of strands 16 which each comprises a plurality of reinforcing fibers 17 and at least one polymeric material 19. The laminae 14, 18, 20, and 22 are joined together by fusing a portion of the polymeric material 19 of one lamina 12 with a portion of the polymeric material 19 of another lamina 12. For example, polymeric material 19 from the strands 16 of the lamina 14 fuses with the polymeric material 19 from the strands 16 of the lamina 18; polymeric material 19 from the strands 16 of the lamina 18 fuses with the polymeric material 19 from the strands 16 of the lamina 20; and polymeric material 19 from the strands 16 of the lamina 20 fuses with the polymeric material 19 from the strands 16 of the lamina 22.

For any panel 10, the polymeric material 19 of the laminae 12 are sufficiently melted and fused together to provide the panel 10 with the mechanical properties desired. The polymeric material 19 from each of the strands 16 forms all, substantially all, or at least part, of the matrix for the reinforcing fibers 17 of each panel 10, according to the present invention. All of the matrix refers to the polymeric material 19 from the strands 16 providing all of the matrix except for that formed by any chemical treatment that may have been applied to the reinforcing fibers 17 or any fibers made of the polymeric material 19. Substantially all of the matrix refers to the polymeric material 19 from the strands 16 being enough to provide a matrix for all of the reinforcing fibers 17 in the panel 10. It does not preclude the use of additional matrix material from a source other than the strands 16.

In the exemplary panel 11, the various laminae 14, 18, 20 and 22 are positioned angularly in relation to each other. The first lamina 14 is arranged angularly to the second lamina 18 which is arranged angularly to the third lamina 20. The third lamina 20 is arranged angularly to the fourth lamina 22. By arranging the various lamina in this manner, the panel 11 is provided with reinforcement against loads applied along both its machine direction (i.e., length) and its cross machine direction (i.e., width). The strands 16 forming any lamina of a panel 11 can be positioned next to each other or they can be spaced apart. For some applications, a porous panel 11 is desirable. For example, having a porous panel 11 would allow air to flow through the panel 11 in order to compensate for air pressure differences on either side of the panel 11. For such an application, the strands 16 in each lamina of a panel 11 can be sufficiently spaced apart to form openings through the panel 11. Laminae having strands spaced up to about 1 inch (2.54 cm) apart have been produced. It is believed that panels 11 with laminae having strands 16 spaced even further apart can also be successfully produced.

As shown in FIG. 1, each of the laminae 14, 18, 20 and 22 is in the form of a reinforcement mat 24 which has a first layer 26 of the strands 16 and a second layer 28 of the strands 16. The first and second layers 26 and 28 are positioned relative to one another so that the strands 16 of one layer 26 are at an angle Θ from the strands 16 of the other layer 28. It is desirable for the angle Θ to be in the range of from about 6° to about 174°. It is more desirable for the angle Θ to be in the range of from about 60° to about 120°. The first layer 26 of strands 16 is angularly positioned in relation to the second layer 28 of strands 16 so that each lamina 12 can more efficiently carry loads.

During the formation process of mat 24, the first and second layers 26 and 28 are brought together and heated such that at least a portion of the polymeric material 19 incorporated into the first and second layers 26 and 28 bond together so as to join the strands 16 of the first and second layers 26 and 28 to one another to form the mat 24. In other words, the polymeric material 19 of the layers 26 and 28 are sufficiently fused together to provide the lamina 12 with the mechanical properties desired. The process for forming such a mat 24 and a description of the mat 24 are set out in copending U.S. patent application Ser. No. 08/713,319 (Attorney Docket No. 24084A) entitled "PROCESS AND APPARATUS FOR MAKING A REINFORCING MAT," filed Sep. 13, 1996, and in copending U.S. patent application Ser. No. 08/713,318 (Attorney Docket No. 23689A) entitled "A REINFORCEMENT MAT," filed Sep. 13, 1996. Both of these applications are hereby incorporated by reference in their entireties.

As an option, one or more of the mats 24 of the panel 11 can further include a third layer 30 of the strands 16. The strands 16 of the layer 30 run lengthwise or in the machine direction of the mat 24. The polymeric material 19 from the layer 30 is sufficiently fused with the polymeric material 19 from one or more of the other layers 26 and 28. Each mat 24 may also include a layer or film 31 of polymeric material sandwiched between and fused to any two of the layers 26, 28, and/or 30 to serve as part of the matrix for the reinforcing fibers 17.

As stated above, the laminae 12, which form the panel 11, or other of the present panels 10, can be positioned in an angular relation to each other. Particularly, each of the laminae 12 can be positioned in an angular relation to the lamina 12 on one or either side thereof. It is desirable for the angle between two adjacent laminae 12 to be in the range from about 30° to about 150°. It is more desirable for the angle between consecutive laminae 12 to be in the range of from about 60° to about 120°. It can be even more desirable for the laminae 12 to be arranged approximately perpendicular to each other (i.e., at an angle of about 90°).

The panel 11 can be formed from two to sixteen of the laminae 12, such as the reinforcement mats 24 described above, or possibly even more of the laminae 12. It can be desirable for the panel 11 to be formed from six to twelve, or even from eight to ten, of the laminae 12, such as the reinforcement mats 24 described above.

The panel 11, or other of the present panels 10, may be further reinforced by means of additional reinforcing materials including those selected from the group consisting of glass fibers, graphite fibers, aramid fibers, silicon carbide fibers and other fibers having suitable reinforcing properties and combinations thereof. It can be desirable for these additional reinforcing materials to be formed into nonwoven or woven mats 43 (see FIGS. 2 and 3). By "nonwoven", it is meant that the reinforcing materials in the mat are not systematically woven together. One such reinforcing material is a nonwoven glass fiber mat, such as the continuous strand mats available from Owens Corning, of Toledo, Ohio, under the product designations M8608 and M8610. These types of mats are made of glass fibers laid in a continuous swirl pattern. Nonwoven glass fiber mats can be formed by air laying glass fibers onto a conveyor and then passing the air laid fibers through a compression or dessication process to form the mat. One nonwoven glass fiber mat 43 can be sandwiched between one or more pairs of adjacent laminae 12, the laminae 12 can be sandwiched between a pair of the nonwoven glass fiber mats 43 (see FIGS. 2 and 3), or both.

The panel 11, or other of the panels 10, may also include a surface finish to enhance the appearance and/or to further protect the panel. It is desirable for the surface finish to have good weatherability. Useful surface finishes include, for example, plastic films, ultraviolet protectants, water repellents, canvases (e.g., awning material).

Figure 2:
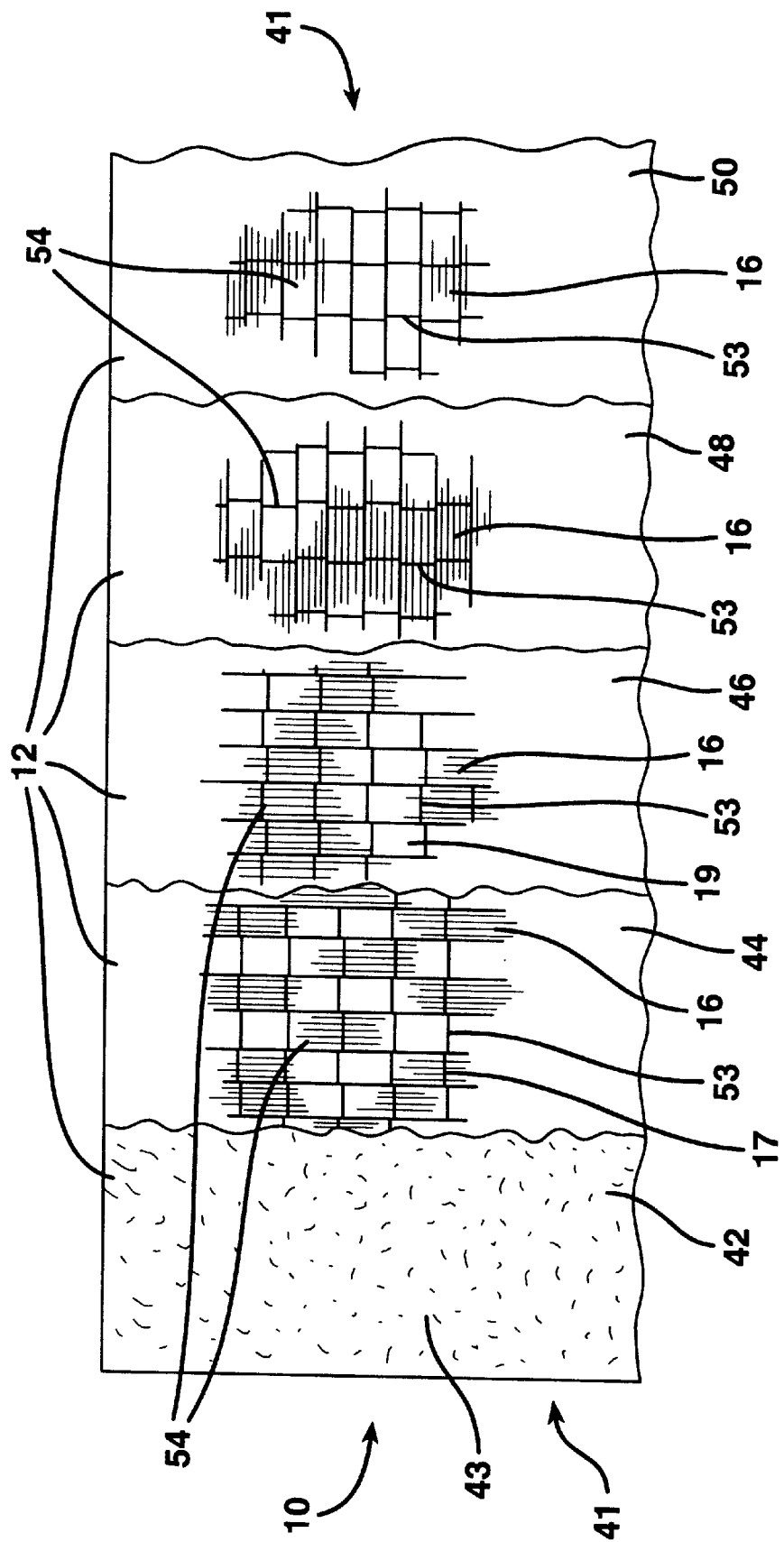
FIG. 2 presents a cutaway view showing the laminae of a panel formed according to another embodiment of this invention.

Referring to FIG. 2, another embodiment 41 of the panel 10 comprises laminae 12 formed from strands 16 which are woven together by means of one or more threads 53 running at an angle (e.g., transversely) to the strands 16 to form woven mats 54. The example of the panel 41 shown in FIG. 2 includes a first lamina 42, a second lamina 44, a third lamina 46, a fourth lamina 48 and a fifth lamina 50. Each of the laminae 44, 46, 48 and 50 comprises a plurality of strands 16 which each comprise a plurality of reinforcing fibers 17 and at least one polymeric material 19. The laminae 44, 46, 48 and 50 are positioned between a pair of lamina 42 (one shown in FIG. 2) which each comprises additional reinforcing materials, such as that described above. In the embodiment shown, the additional reinforcing materials forming the lamina 42 are nonwoven mats 43.

In the embodiment shown in FIG. 2, the first and second laminae 44 and 46 are arranged with their strands 16 parallel to each other and the third and fourth laminae 48 and 50 are arranged with their strands 16 parallel to each other. The first and second woven lamina 44 and 46 are arranged in an angular relation, here about 90°, to the third and fourth woven lamina 48 and 50. The angular arrangement of the laminae 44, 46, 48 and 50, as shown or at any other angle, provides the panel 10 with reinforcement in both its machine direction and its cross machine direction, i.e., along both its length and its width.

In one modification of the panel 41, six laminae 12, formed from woven mats such as mat 54, are arranged in pairs, with the strands 16 in each pair being oriented in the same direction. A first pair of the woven mats 54 is sandwiched between a second pair and a third pair of the woven mats 54. The strands 16 of the first pair of mats 54 are positioned in an angular relation to the strands 16 of both the second and third pairs of mats 54 to form a laminated structure. This laminated structure is sandwiched between a pair of nonwoven fiber mats 43.

The strands 16 of the panels 41 can be woven together by means of a conventional weaving process known in the art to weave glass fibers into mats 54. Typically, the strands 16 are woven together by threads 53 running transverse to the strands 16. These threads 53 can be made from any suitable thread fiber including those selected from the group consisting of glass fibers, nylon fibers, polyamide fibers, polypropylene fibers, polyester fibers, polyethylene fibers, and polyphenylene sulfide fibers. It can be desirable for the thread 53 to be formed from the same material as the polymeric material 19 used in the strands 16. Another strand 16 could also be used for the thread 53.

To maintain the strands 16 in position in the woven mat 54 and to prevent fraying, the edges of the mat 54 can be stitched after the strands 16 have been woven together. The ends of the strands 16 can also be heated to at least partially melt the polymeric material 19 and, thereby, prevent movement of individual fibers in the strands 16. Such heating is particularly desirable with commingled strands 16.

The panel 41 can be formed from two to sixteen or even more laminae 12, such as the woven mats 54, and additional reinforcing materials, such as nonwoven fiber mats 43. It is desirable for the panel 41 to be formed from four to twelve, or even more, of such laminae 12, depending on the diameter of the strands 16 and the application for which the panel 41 is being used.

Figure 3:
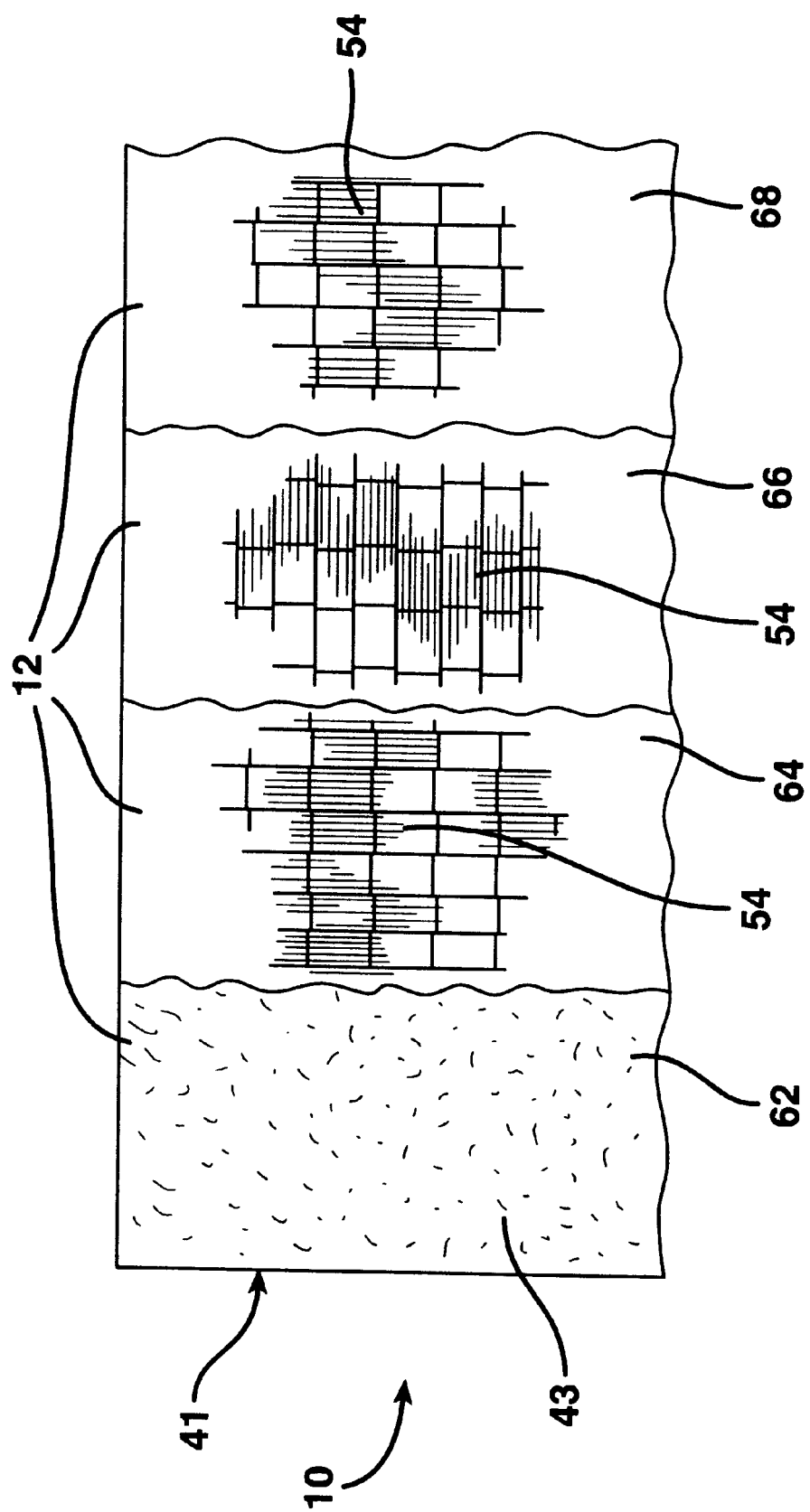
FIG. 3 present a cutaway view of a modification of the panel of FIG. 2.

Referring to FIG. 3, an alternative panel 41 comprises a first lamina 62 formed from an additional reinforcing material which, in the embodiment shown, is a nonwoven glass fiber mat 43; a second lamina 64 formed from a woven mat 54; a third lamina 66 formed from a woven mat 54; and a fourth lamina 68 formed from a woven mat 54. The second lamina 64 is shown with its strands 16 oriented angularly, as shown about 90°, in relation to the strands 16 of the third lamina 66. The strands 16 of the fourth lamina 68 are shown as being positioned about parallel to the strands 16 of the second lamina 64 (i.e., about perpendicular to the strands 16 of the third lamina 66). However, the laminae 62, 64, 66 and 68 can be oriented in any desired manner to reinforce the alternative panel 41. Again, by positioning the various woven laminae 64 and 66 angularly in relation to each other, the panel 41 is provided with reinforcement against loads applied along both its machine direction (i.e., length) and its cross machine direction (i.e., width).

In another modification of the panel 41, an additional reinforcing material, such as a woven or nonwoven mat 43 made from aramid fibers, is positioned between a first lamina and a second lamina, both of which are formed from woven fiber mats, such as the mat 54. The first lamina is positioned with its strands 16 in an angular relation to those of the second woven lamina. A third lamina, formed from a woven fiber mat, such as the mat 54, is layered on the first lamina with its strands 16 in an angular relation to those of the first lamina. A fourth lamina, formed from a woven fiber mat, such as the mat 54, is layered on the second lamina with its strands 16 positioned in an angular relation to the strands 16 of the second lamina to form a laminated structure. This laminated structure is sandwiched between two layers of additional reinforcing materials, such as the nonwoven fiber mats 43 described above.

The panel 10 can be formed by any suitable molding process such as, for example, compression molding, transfer molding or injection molding. The individual laminae 12 can be formed by the process described in U.S. patent application Ser. No. 08/713,318, incorporated by reference above, by a conventional weaving process, or any other suitable process, depending upon which type of laminae 12 will be used. After the separate laminae 12 have been formed, they are positioned in a mold cavity, for example, of a compression molding, transfer molding or injection molding apparatus. During this time, the optional additional reinforcing materials, such as the woven and/or nonwoven fiber mats 43 and surface finishes, can be positioned in the mold. The laminae 12 are then compressed, or pressure otherwise applied, to form a panel 10. As the laminae 12 are being compressed, the mold is heated to cause portions of the polymeric material 19 of the strands 16 from the separate lamina 12 to fully, or at least partially, melt and fuse or bond to each other and to bond to other polymeric material 19 in other laminae 12. After the panel 10 has been compressed to a desired thickness and density, it is removed from the mold and can be painted, coated with a protective coating and processed further if necessary. In addition, the final surface finish (e.g., a canvas) can be incorporated as an integral part of the panel 10 by including the surface finish in the molding process.

EXAMPLES

Panels were formed according to the above described method and were tested to determine their tensile stress, tensile modulus, flexural stress, flexural modulus, notched Izod and high rate impact strength. For comparison purposes, a glass fiber mat infiltrated with a thermoplastic material (GMT) was also tested. The panels tested had the following configurations:

Panel A—This panel was formed from 12 laminae. The individual lamina were reinforcement mats formed by the process described in U.S. patent application Ser. No. 08/713,318, incorporated by reference above, using commingled glass and polypropylene fibers. First portions of the strands of each lamina were arranged at a 90° angle to second portions of the strands of each lamina to form a reinforcement mat such as the mats 24 described above. The odd numbered lamina were positioned at a 90° angle to even numbered lamina. In other words, alternating lamina were arranged at a 90° angle to each of the other laminae.

Panel B—This panel had the same configuration as panel A with each side of the panel being covered with a layer of generic polypropylene film.

Panel C—This panel was formed using the laminae formed from woven mats such as mat 54 described above. The woven mats were formed from strands comprising commingled glass reinforcing fibers and polypropylene fibers. In this panel, a first pair of laminae was positioned between a second pair of laminae and a third pair of laminae. The strands in laminae forming each pair were substantially parallel to each other. The first pair of laminae was positioned at a 90° angle to the second and third pair of laminae. The entire structure was then sandwiched between two nonwoven glass fiber mats.

Panel D—This panel was formed using laminae formed from woven mats, such as mat 54 described above, comprising commingled glass-polypropylene fibers. In this panel a woven mat made of glass fibers, such as mat 54 described above, was positioned between first and second laminae formed from woven mats. The first and second laminae were positioned with their strands at a 90° angle to each other. The first and second laminae were then positioned between third and fourth lamina. The third lamina was positioned adjacent the first lamina at a 90° angle to the first lamina and at a 0° angle to the second lamina. The fourth lamina was positioned adjacent the second lamina at a 90° angle to the second lamina and at a 0° angle to the first lamina.

The above tests were performed according to the indicated ASTM testing standards except for the "High Rate Impact" test which was performed on a Rheometrics Model RHIT-8000 High Rate Impact Tester. The test results were as follows:

|  | GMT | PANEL A MD/CD[1] | PANEL B MD/CD | PANEL C MD/CD | PANEL D MD/CD |
|---|---|---|---|---|---|
| Tensile Stress[2] ($10^3$ psi) | 12.69 | 9.97/10.27 | 6.40/8.44 | 25.33/12.65 | 11.25/15.63 |
| Tensile Modulus[3] ($10^6$ psi) | 0.83 | 0.555/0.655 | 0.528/857 | 1.096/0.639 | 0.853/1.02 |
| Flexural Stress[4] ($10^3$ psi) | 18.16 | 6.59/8.27 | 6.72/8.70 | 15.00/6.72 | 18.17/10.13 |
| Flexural Modulus[5] ($10^6$ psi) | 0.78 | 0.386/0.491 | 0.309/0.364 | 1.252/0.269 | 0.828/0.507 |
| Notched Izod[6] (ft-lb) | 4.8 | 31.38/26.64 | 34.79/39.17 | 35.22/25.10 | 23.46/21.33 |
| High Rate Impact (in-lb) | 235 | 662 | 620 | 374 | 373 |

Notes:
[1]Machine Direction/Cross Machine Direction
[2]ASTM D 638
[3]ASTM D 638
[4]ASTM D 790
[5]ASTM D 790
[6]ASTM D 256

These tests demonstrate that these panels have an improved strength for both impact resistance and puncture resistance.

The panel 10 of this invention can be used to make storm shutters either individually or by combining a plurality of panels. The panels 10 are also useful to make protective coverings for cash windows of financial institutions, coverings for kiosks and carts in open areas of shopping malls, side panels for tractor trailers, boat hulls, aircraft parts and other articles and parts for which impact resistance and/or puncture resistance are desired.

Figure 4:
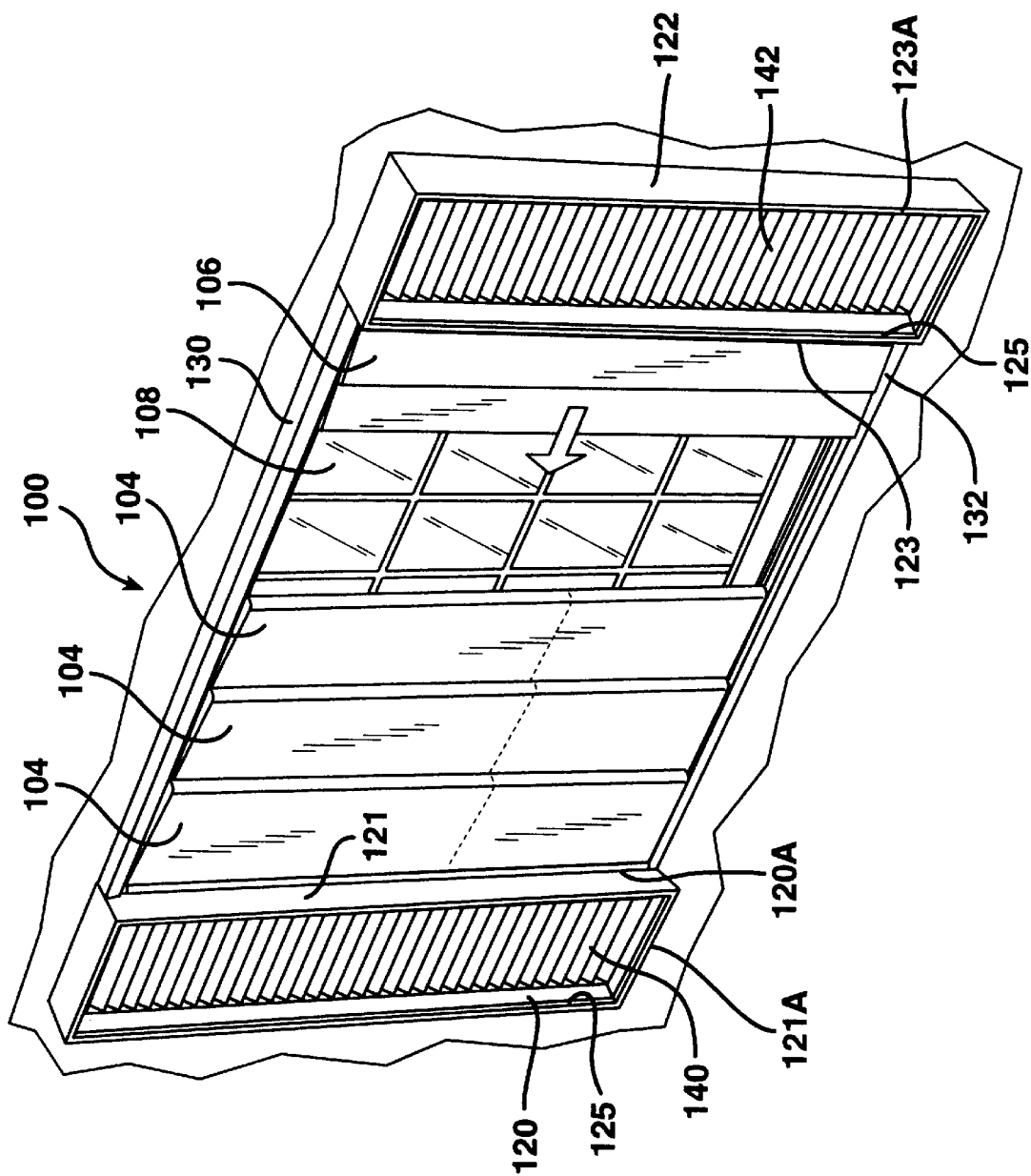
FIG. 4 presents a perspective view of a plurality of panels of this invention in the form of a shutter assembly.

FIG. 4 presents a perspective view of panels of this invention being combined to form a shutter assembly or shutter covering 100 for protecting a structural element such as a window 108 mounted in a house or other structure. In the illustrated embodiment, the shutter assembly 100 comprises first and second containers 120 and 122 positioned on opposing sides of the window 108. The assembly 100 also comprises a plurality of first and second protective panels 104 and 106 which are stored respectively in the first and second containers 120 and 122 when not being used to protect the window 108. The protective panels 104 and 106 are formed in essentially the same manner and from the same materials as the panels 10 described above.

The first container 120 includes a first slot 120a located along a side portion 121 adjacent to the window 108, see FIG. 4. The second container 122 includes a second slot 122a located along a side portion 123 adjacent to the window 108, see FIG. 4A. The first protective panels 104 are movable through the first slot 120a so as to cover and protect a first portion, e.g., about one half, of the window 108, and the second protective panels 106 are movable through the second slot 122a so as to cover and protect a second portion, e.g., a second half, of the window 108.

Figure 4A:
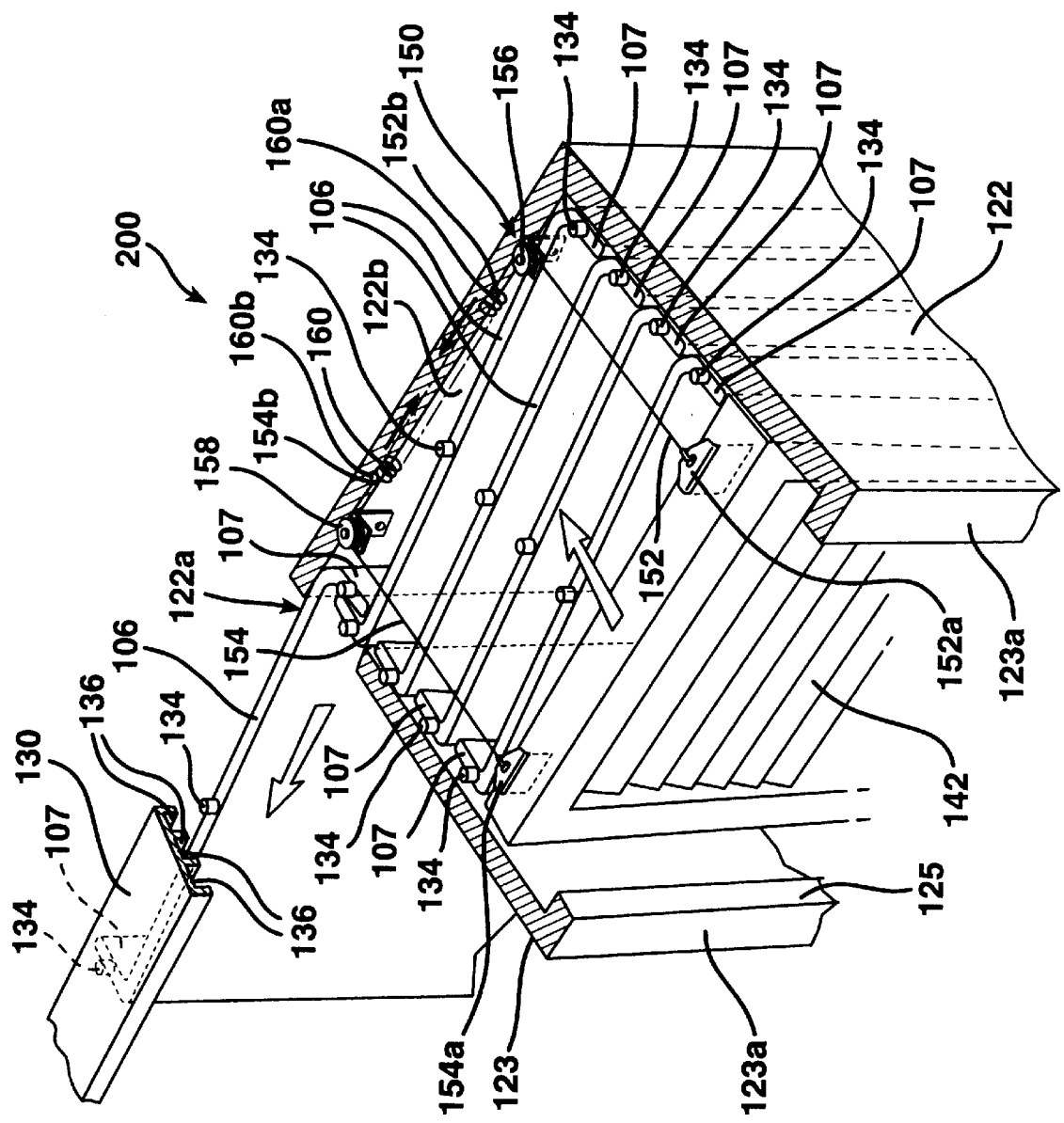
FIG. 4A presents a perspective, sectional view of a portion of the shutter assembly shown in FIG. 4.

The first and second protective panels 104 and 106 are molded or otherwise formed with flanges 107 along their opposing side edges such that flanges 107 on adjacent protective panels are capable of interconnecting with one another, see FIG. 4A. In the illustrated embodiment, the flanges 107 extend along the entire extent of the panel side edges. Alternatively, the flanges 107 may extend less than the full extent of each panel side edge.

The shutter assembly 100 further includes first and second guide tracks 130 and 132 extending between the first and second containers 120 and 122 in mutually facing parallel relation, see FIG. 4. The guide tracks 130 and 132 receive and support the first and second protective panels 104 and 106 when the protective panels 104 and 106 are positioned to cover and protect the first and second portions of the window 108. The upper and lower guide tracks 130 and 132 are constructed in essentially the same manner. Each guide track 130 and 132 is formed with three channels 136, see FIG. 4A. In the illustrated embodiment, each of the first and second protective panels 104 and 106 is provided with three upper lugs 134, see FIG. 4A, and three lower lugs (not shown) which are adapted to be received in corresponding channels 136 in the first and second guide tracks 130 and 132 when the first and second panels 104 and 106 are moved out of the first and second containers 120 and 122 to their respective window covering positions.

Each of the first and second containers 120 and 122 includes an opening 125 in a front portion thereof. The front portions of the containers 120 and 122 extend substantially perpendicular to the container side portions 121 and 123 and comprise flanges 121a and 123a.

The shutter assembly 100 further includes first and second front panels 140 and 142 which are positioned respectively in the first and second containers 120 and 122. The front panels 140 and 142 comprise facades for the first and second containers 120 and 122 which may be tailored or customized so as to complement the styling or design of the window 108 and/or the structure. The front panels 140 and 142 engage the outermost first and second protective panels 104 and 106 in the first and second containers 120 and 122 and are visible through the openings 125 in the front portions of the containers 120 and 122.

Each of the first and second containers 120 and 122 further includes upper and lower spring assemblies 150 (only the upper spring assembly 150 of the second container 122 is illustrated, see FIG. 4A). The upper and lower spring assemblies 150 are constructed in the same manner and comprise a first cable 152 having first and second ends 152a and 152b, a second cable 154 having third and fourth ends 154a and 154b, first and second rollers 156 and 158 and a tension spring 160. In FIG. 4A, the first end 152a of the first cable 152 is connected to the front panel 142 via a bracket, clip or like element and the second end 152b is connected to a first end 160a of the tension spring 160. The third end 154a of the second cable 154 is connected to the front panel 142 via a bracket, clip or like element and the fourth end 154b is connected to a second end 160b of the tension spring 160. The first cable 152 extends about the first roller 156 and the second cable 154 extends about the second roller 158. The first and second rollers 156 and 158 are connected via a bracket to a back wall 122b of the second container 122.

The upper and lower spring assemblies (not shown) secured to a back wall of the first container 120 bias the first front panel 140 and each of the first protective panels 104 remaining in the first container 120 toward the first container back wall. Similarly, the upper and lower spring assemblies 150 secured to the back wall 122b of the second container 122 bias the second front panel 142 and each of the second protective panels 106 remaining in the second container 122 toward the second container back wall 122b.

The first and second protective panels 104 and 106 remain stored in the first and second containers 120 and 122 and hidden behind the first and second front panels 140 and 142 until they are needed to protect the window 108. To move the protective panels 104 and 106 into position to protect the window 108, the panels 104 and 106 are manually pulled from the first and second containers 120 and 122 such that their upper and lower lugs 134 move along the channels 136 formed in the tracks 130 and 132. As the panels 104 and 106 are pulled from their containers 120 and 122, their flanges 107 interlock to pull successive protective panels from behind the front panels 140 and 142. The interlocking flanges 107 also function to help prevent penetration of airborne debris and precipitation through the shutter assembly 100 to the window 108 once they have been positioned to cover and protect the window 108. As each first panel 104 moves through the slot 120a and out of the first container 120, the first front panel 140 moves a distance equal to the thickness of one panel 104 toward the back wall of the first container 120 via the first container upper and lower spring assemblies. Similarly, as each second panel 106 moves through the slot 122a and out of the second container 122, the second front panel 142 moves a distance equal to the thickness of one panel 106 toward the back wall 122b of the second container 122 via the second container upper and lower spring assemblies 150.

When protection of the window 108 by the assembly 100 is no longer required, the protective panels 104 and 106 are manually returned in successive order to their respective containers 120 and 122. As each first panel 104 moves into the first container 120, the front panel 140 moves against the return forces exerted by the first container upper and lower spring assemblies 150 a distance equal to the thickness of one protective panel 104. Similarly, as each second panel 106 moves into the second container 122, the front panel 142 moves against the return forces exerted by the second container upper and lower spring assemblies 150 a distance equal to approximately the thickness of one protective panel 106. The front portion flanges 121a and 123a prevent the front panels 140 and 142 from being forced out of the first and second containers 120 and 122 by the returning protective panels 104 and 106.

Figure 5:
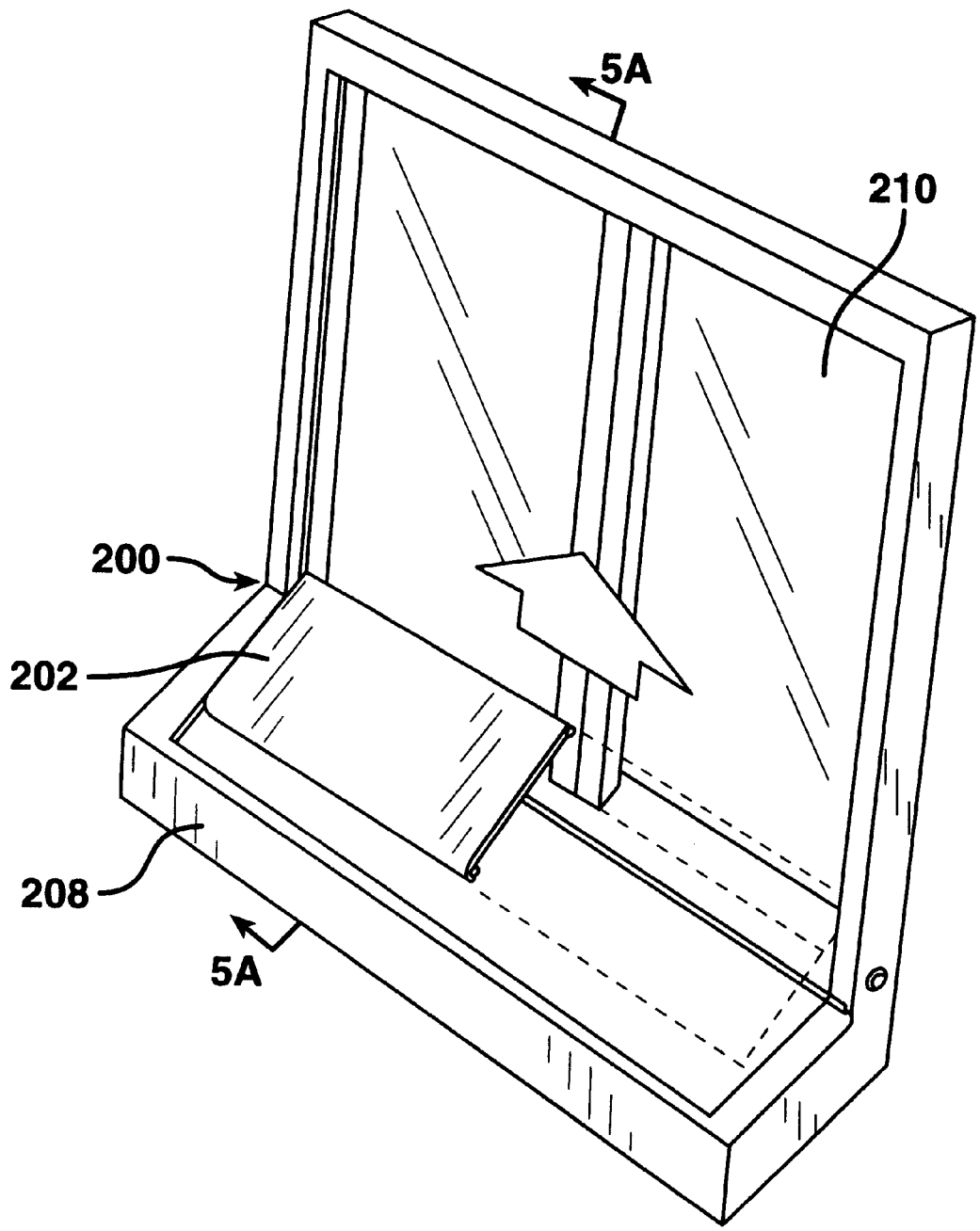
FIG. 5 presents a perspective view of a plurality of panels of this invention in the form of an alternate shutter.
Figure 5A:
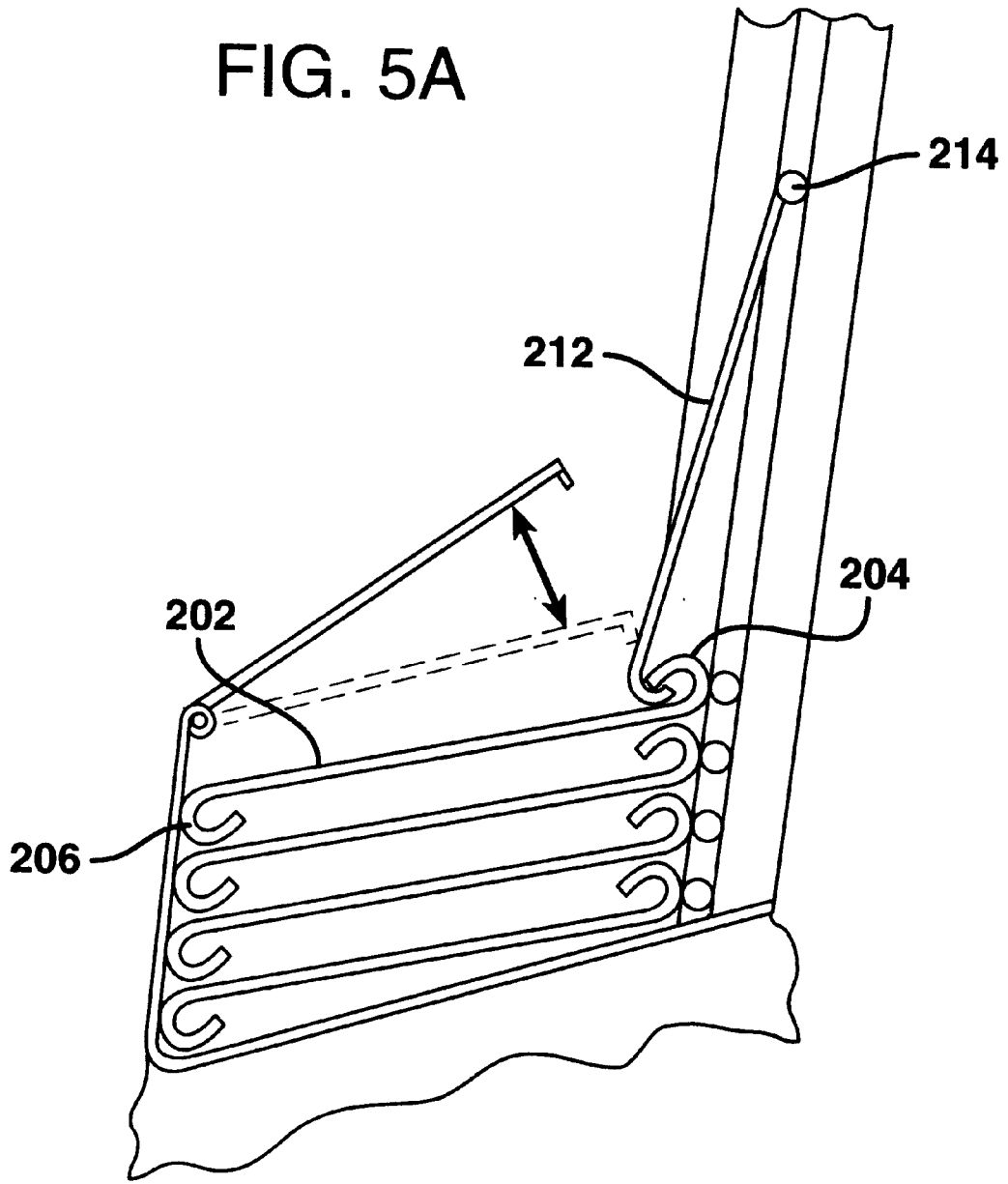
FIG. 5A presents a sectional view of the shutter of FIG. 5, taken along lines 5A—5A.

FIG. 5 presents a perspective view of panels of this invention being combined to form another shutter 200. The shutter 200 comprises a plurality of panels 202, each having a first lip 204 and a second lip 206, as shown in FIG. 5A. The panels 202 are stored in a box 208 under the window 210. The panels 202 are moved into position to protect window 210 by means of an interiorly or exteriorly mounted crank or pull cord. The first lip 204 of the first panel 212 is mounted on a slide bar 214 which pulls the panels 202 into position. As the panels 202 are raised, the second lip 206 on one panel engages the first lip 204 on the panel beneath it to raise that panel to cover the window 210. Again, the interlocking nature of the panels 202 helps to protect the window 210 from the penetration of airborne debris and precipitation through shutter 200 to window 210.

Figure 6:
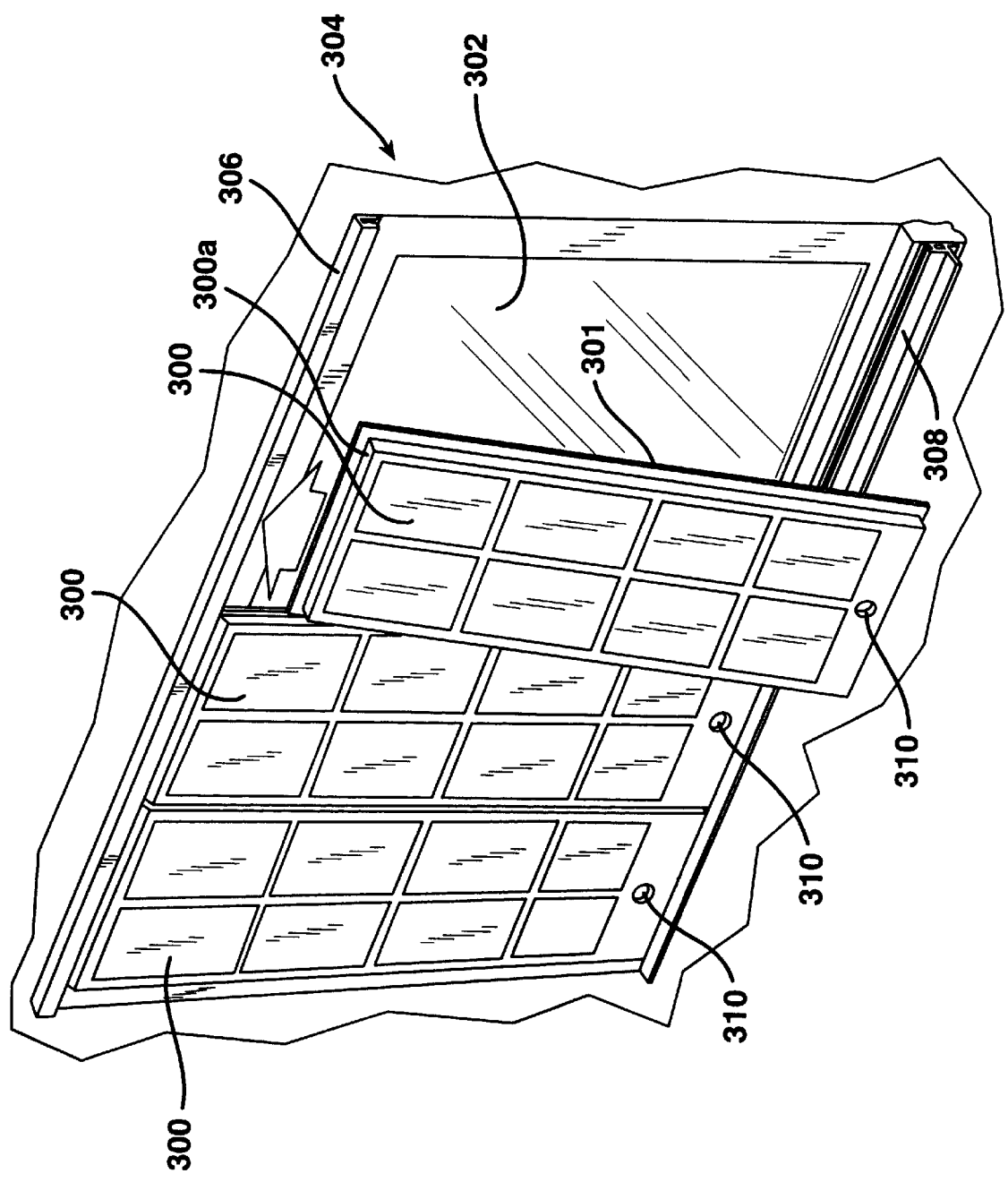
FIG. 6 presents a perspective view of a plurality of panels of this invention in the form of a window covering.
Figure 6A:
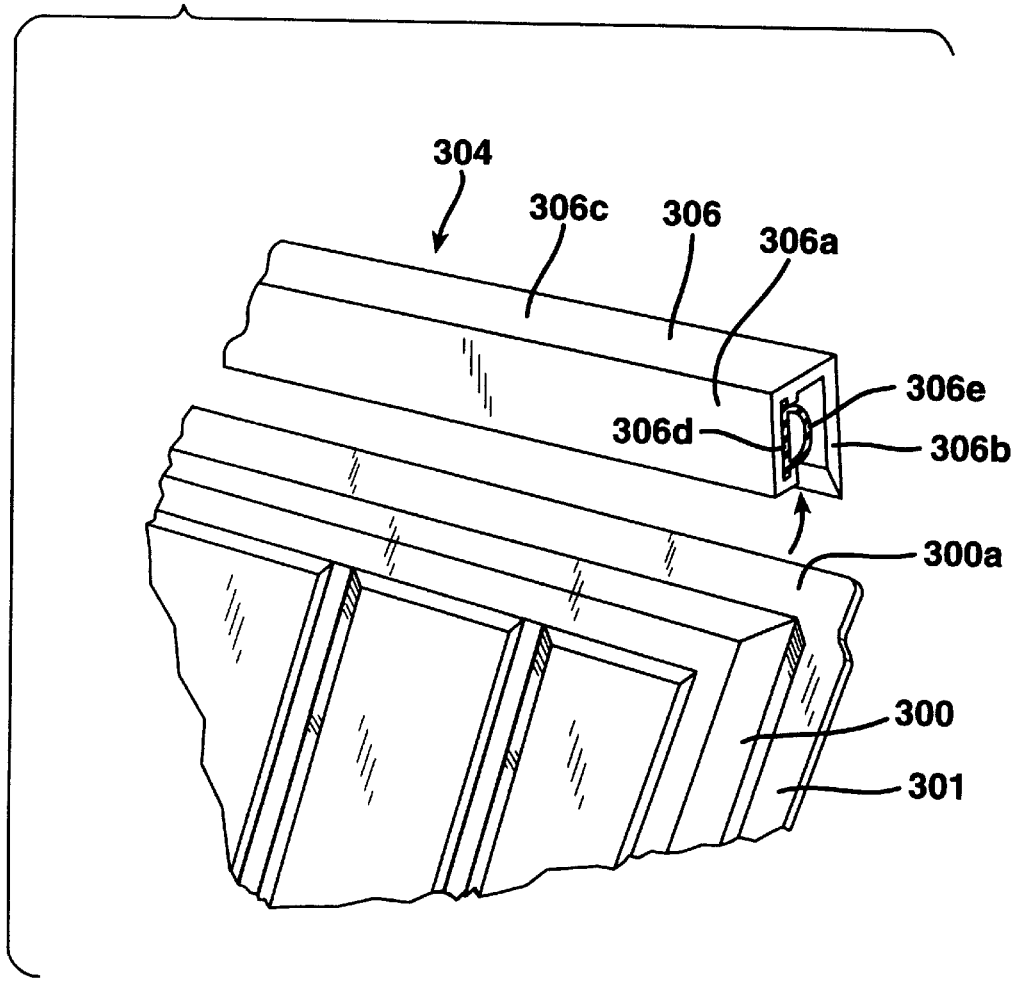
FIG. 6A presents an enlarged view of a portion of the window covering illustrated in FIG. 6.

FIG. 6 presents a perspective view of panels of this invention being employed to form another type of protective covering 304. In this embodiment, the protective covering 304 includes a series of protective panels 300 and first and second mounting members 306 and 308 to which the panels 300 are separately mounted to protect a window 302. The first and second mounting members 306 and 308 are secured via conventional fasteners to the structure (not shown) in which the window 302 is mounted. The protective panels 300 are formed in essentially the same manner and from the same materials as the panels 10 described above.

The first mounting member 306 comprises first and second legs 306a and 306b and a base 306c which is coupled to or integrally formed with the legs 306a and 306b. The legs 306a and 306b and the base 306c define a C-shaped channel which is adapted to receive a first edge portion 300a of each of the protective panels 300. The first leg 306a includes a recess 306d provided with a gasket 306e. The gasket 306e engages the panel edge portions 300a when the edge portions 300a are inserted into the C-shaped channel. Thus, the panel edge portions 300a are frictionally held in the first mounting member 306 by the gasket 306e and the second leg 306b. The gasket 306e also functions to prevent water from penetrating between the panels 300 and the mounting member 306.

Each panel 300 is provided with one or more locking mechanisms 310 which releasably secure the panel 300 to the second mounting member 308, see FIGS. 6B–6E. In the illustrated embodiment, only a single locking mechanism 310 is provided in each panel 300. However, each panel 300 may comprise two or more locking mechanisms 310.

The second mounting member 308 comprises a flange 308a for receiving and supporting a second edge portion 300b of each of the panels 300. The second mounting member 308 further includes a locking flange 308b to which the locking mechanism 310 connects so as to secure each panel 300 to the second mounting member 308.

In the illustrated embodiment, the locking mechanism 310 comprises a latch mechanism having a housing 312 and a latch portion 314. The housing 312 includes first and second housing sections 312a and 312b. Each panel 300 is formed with one or more openings 300c (only one in the illustrated embodiment) in a lower portion thereof which extends completely through the panel 300. The first housing section 312a extends through the opening 300c, see FIGS. 6D and 6E. A flange portion 312c of the first housing section 312a engages an outer surface 300d of the panel 300. The second housing section 312b is bolted or otherwise fastened to the first housing section 312a and engages an inner surface 300e of the panel 300.

Figure 6B:
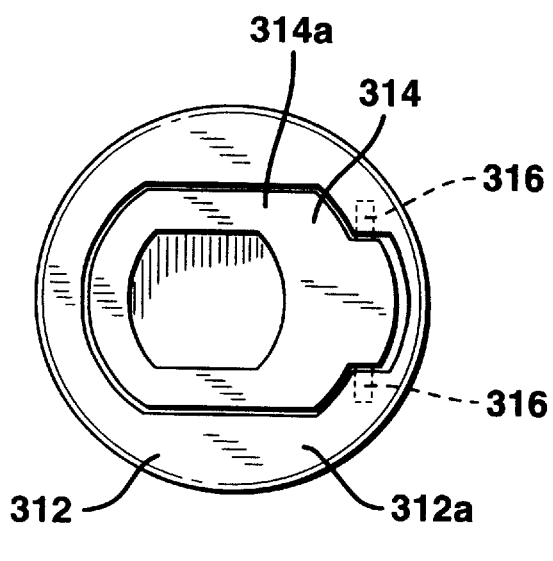
FIG. 6B presents a top view of a latch mechanism that can be used to attach protective panels to a second mounting member.
Figure 6C:
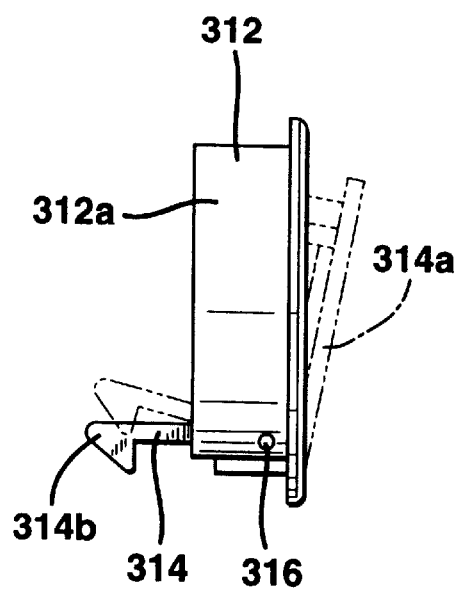
FIG. 6C is a side view of a portion of the latch mechanism illustrated in FIG. 6B.

The latch portion 314 is pivotably mounted to the first housing section 312a via one or more pivot pins 316. The latch portion includes a pull ring 314a and a pawl 314b fixedly coupled to the pull ring 314a. The pawl 314b is adapted to engage the locking flange 308b to secure the panel 300 in position adjacent to the window 302 when the pull ring 314a is positioned in a first position, as shown in FIG. 6B, where it is essentially flush with an outer surface of the first housing section 312a. The pawl 314b disengages the locking flange 308b when the pull ring 314a is pivotably moved to a second position, as shown in solid line in FIG. 6D and phantom in FIGS. 6C and 6E, so as to allow the panel 300 to be removed from the first and second mounting members 306 and 308.

Figure 6F:
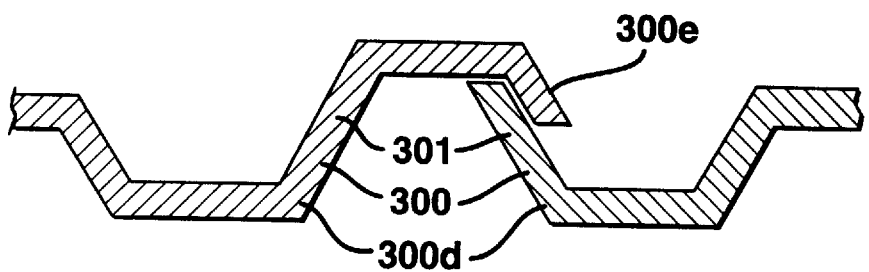
FIG. 6F is a cross sectional view of overlapping edges of two of the panels illustrated in FIG. 6.
Figure 6E:
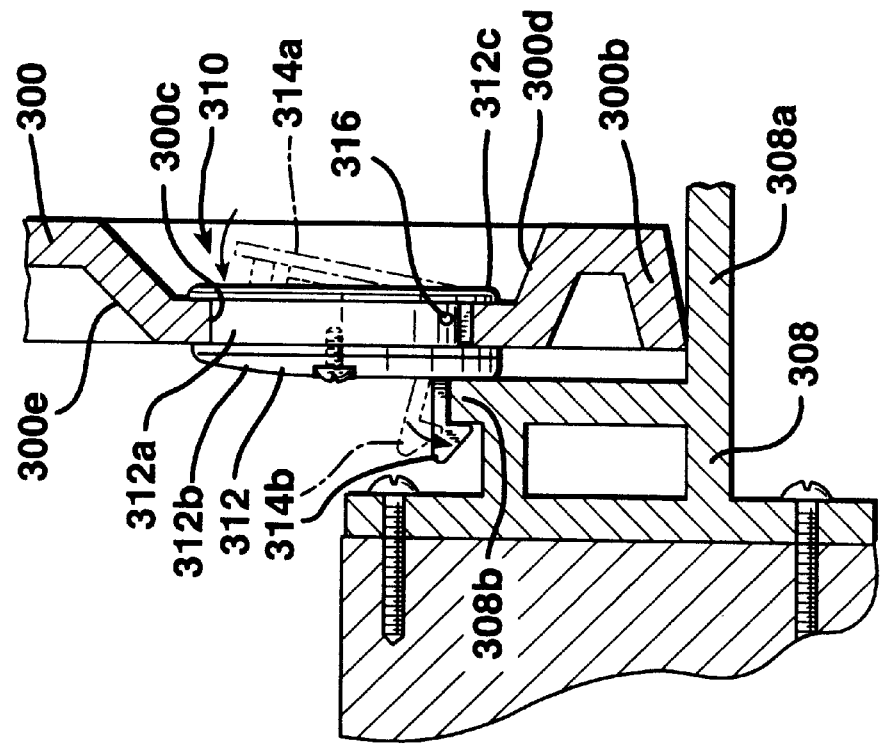
FIG. 6E is a view partially in cross section of the latch mechanism mounted in a panel and illustrating in solid line the latch portion engaged with the second mounting member.
Figure 6D:
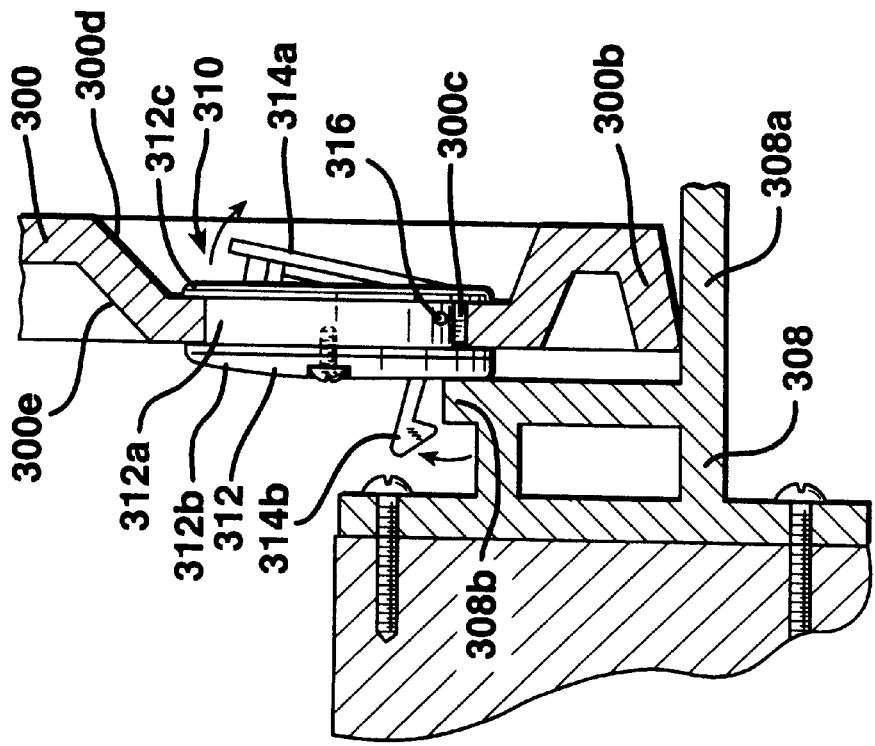
FIG. 6D is view partially in cross section of the latch mechanism mounted in a panel and illustrating in solid line the latch portion disengaged with the second mounting member.

The panels 300 further include along their side edges interlocking flanges 301, see FIG. 6F, to help prevent airborne debris and precipitation from reaching the window 302.

Figure 7:
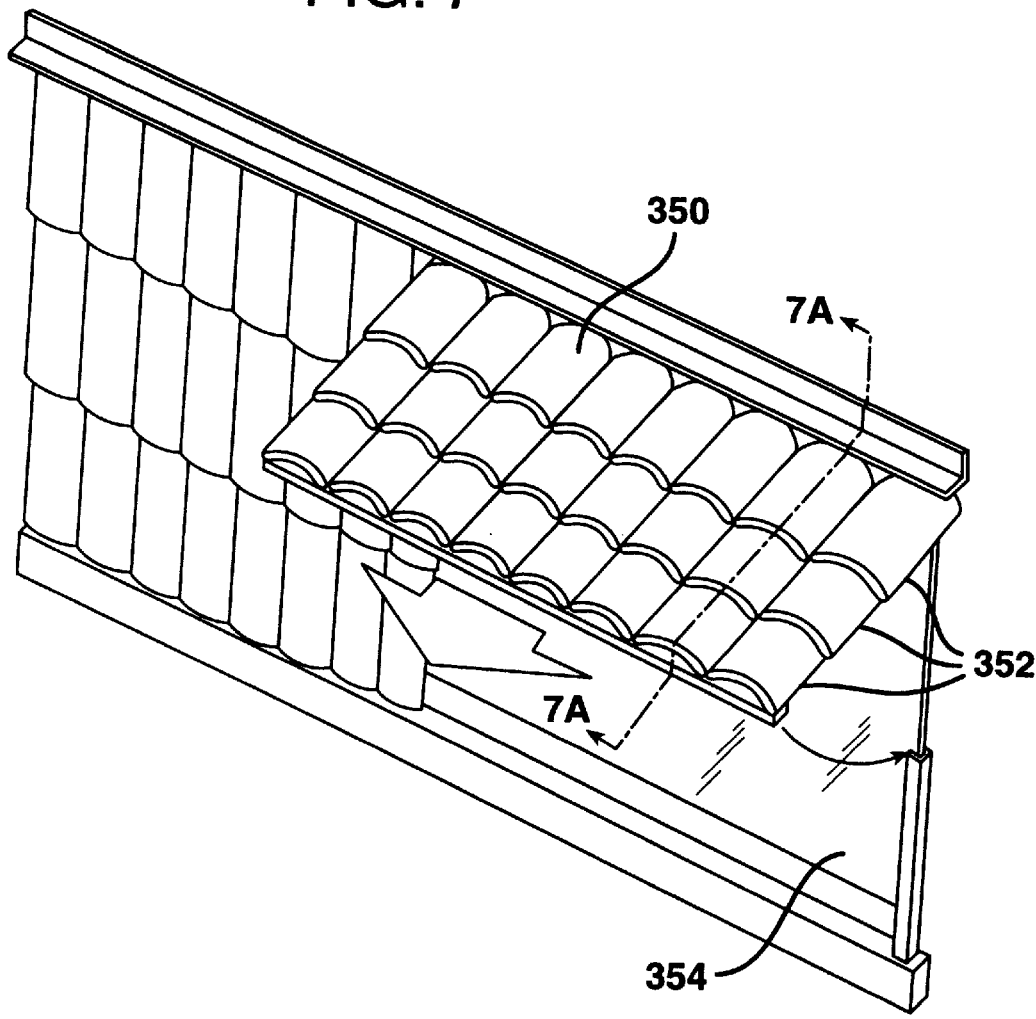
FIG. 7 presents a perspective view of a plurality of panels of this invention in the form of another alternate shutter.
Figure 7A:
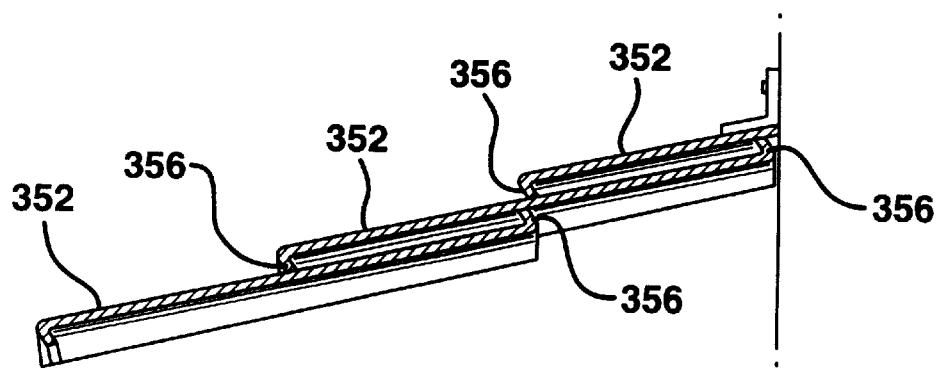
FIG. 7A presents a sectional view of the shutter shown in FIG. 7, taken along lines 7A—7A.

FIG. 7 presents a perspective view of the panels of this invention being used to form an alternate shutter 350 which simulates roofing tile. The shutter 350 comprises a series of panels 352 which are rotatably mounted over a window 354. Each panel 352 includes lips 356, shown in FIG. 7A, which engage each other to prevent the separate panels 352 from being extended past the point of engagement of each panel and to help prevent the penetration of precipitation and wind borne debris from contacting the window 354.

Figure 8:
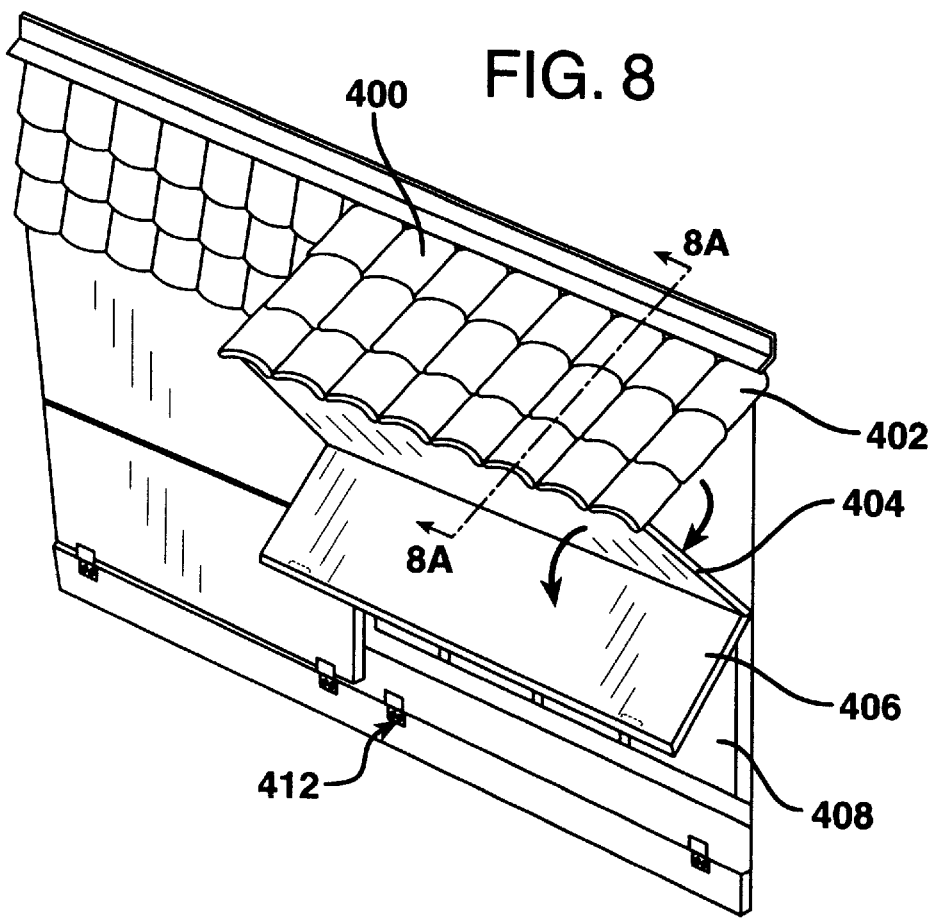
FIG. 8 presents a perspective view of a plurality of panels of this invention in the form of an additional alternate shutter.
Figure 8A:
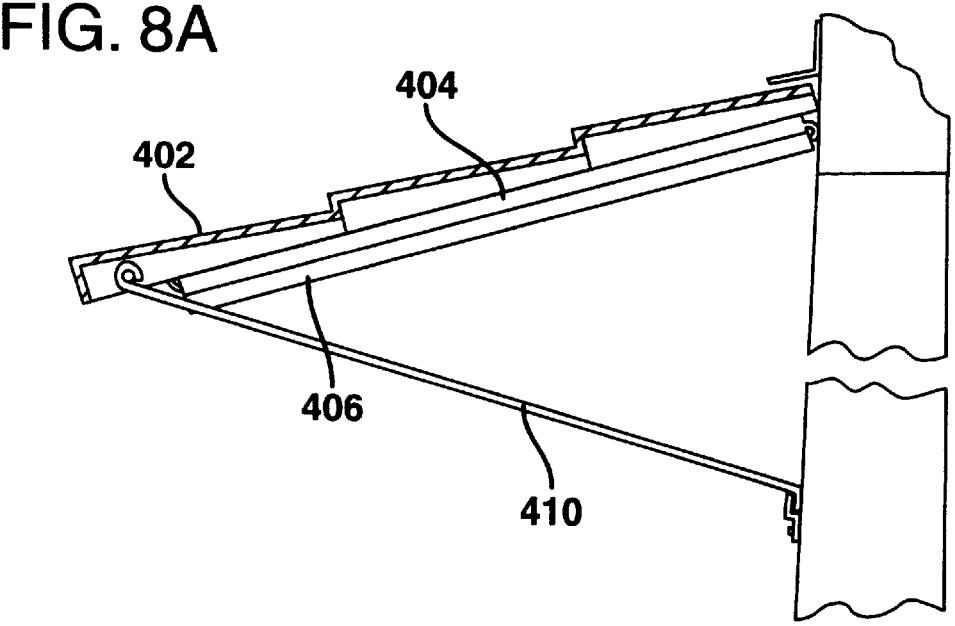
FIG. 8A presents a sectional view of the shutter shown in FIG. 8, taken along lines 8A—8A.

FIG. 8 presents a perspective view of the panels of this invention being used to form another alternate shutter 400 which simulates roofing tile or other surface which complements the architecture of the structure. In this embodiment, the shutter 400 includes a facade section 402, a first section 404 and a second section 406. Rather than sliding into position to cover a window 408, the shutter 400 is hinged so that first section 404 and second section 406 unfold from beneath facade section 402 to cover window 408. Second section 406 can be held in a closed position by securing clips 412 which can be rotatably mounted beneath window 408. When folded into a position at which it is not covering window 408, shutter 400 includes an arm 410 which can be used to brace shutter 400 in an open position.

It is also contemplated that the shutter assembly 100 may comprise a first container for storing all of the protective panels of the shutter assembly and a second container on an opposite side of the window to be protected which does not contain any protective panels. It is further contemplated that one or two containers may be mounted above and/or below the window to be protected.

While certain representative embodiments and details have been shown for the purpose of illustrating the invention, it will be apparent to those skilled in the art that various changes in the product and method described herein may be made without departing from the scope of the invention, which is defined in the appended claims.

What is claimed is:

1. A shutter assembly for protecting at least a portion of a structural element comprising:

first and second containers which are adapted to be positioned on opposing sides of said structural element, said first container having a first slot along a side portion of said first container adjacent to said structural element and said second container having a second slot along a side portion of said second container adjacent to said structural element;

a plurality of first and second protective panels, said first container being capable of storing said first protective panels and said second container being capable of storing said second protective panels, said first protective panels being movable through said first slot so as to cover a first section of said structural element and said second protective panels being movable through said second slot so as cover a second section of said structural element, each of said first and second protective panels is provided with flanges along its opposing side edges such that flanges on adjacent protective panels are capable of interconnecting with one another;

first and second front panels which are positioned respectively in said first and second containers said front panels engaging the outermost ones of said first and second protective panels in said first and second containers; and wherein said first container further includes upper and lower first spring assemblies, each of said first assemblies comprising a first cable having first and second ends, a second cable having third and fourth ends, first and second rollers and a tension spring, said first end of said first cable being connected to said first front panel and said second end being connected to a first end of said tension spring, said third end of said second cable being connected to said first front panel and said fourth end being connected to a second end of said tension spring, and said first cable extending about said first roller and said second cable extending about said second roller.

2. A shutter assembly for protecting at least a portion of a structural element comprising:

at least one containers adapted to be positioned adjacent to a structural element to be protected, said container having a first slot;

at least one protective panel which is capable of being stored in said container, said panel being movable through said slot from a stored position to a position at least partially covering said structural element;

wherein said at least one container comprises first and second containers which are adapted to be positioned on opposing sides of said structural element, said first container having said first slot along a side portion of said first container adjacent to said structural element and said second container having a second slot along a side portion of said second container adjacent to said structural element; and wherein said at least one panel comprises a plurality of panels and each of said first and second containers contains at least one of said panels and includes an opening along a front portion thereof to allow viewing of a substantial portion of said one panel stored therein during normal use, said front portion extending substantially transversely to said side portion.

3. A shutter assembly as set forth in claim 2, wherein said slot is positioned along a side portion of said container which is positioned adjacent to said structural element.

4. A shutter assembly as set forth in claim 2, wherein said at least one protective panel comprises a plurality of first and second protective panels, said first container being capable of storing said first protective panels and said second container being capable of storing said second protective panels, said first protective panels being movable through said first slot so as to cover a first section of said structural element and said second protective panels being movable through said second slot so as cover a second section of said structural element.

5. A shutter assembly as set forth in claim 4, wherein each of said first and second protective panels comprises a fiber reinforced polymeric matrix panel.

6. A shutter assembly as set forth in claim 4, wherein each of said first and second protective panels is provided with flanges along its opposing side edges such that flanges on adjacent protective panels are capable of interconnecting with one another.

7. A shutter assembly as set forth in claim 6, further including first and second guide tracks extending between said first and second containers in mutually facing parallel relation, said guide tracks being adapted to receive and support said first and second protective panels when said first and second protective panels are moved out from said first and second containers.

8. A shutter assembly as set forth in claim 7, wherein each of said first and second protective panels is provided with at least one upper lug and at least one lower lug which are adapted to be received in corresponding channels formed in said first and second guide tracks, and each of said first and second panels having an upper surface from which said at least one upper lug extends.

9. A shutter assembly as set forth in claim 2, wherein said fiber reinforced polymeric matrix panel comprises at least two laminae, each of said lamina comprising a plurality of strands, each of said strands including a plurality of reinforcement fibers and at least one polymeric material, said laminae being joined together by fusing a portion of a polymeric material of one lamina with a portion of a polymeric material of another lamina.

10. A shutter assembly as set forth in claim 2, wherein said fiber reinforced polymeric matrix panel comprises a rigid panel.

11. A shutter assembly for protecting at least a portion of a structural element comprising:

at least one container adapted to be positioned adjacent to a structural element to be protected, said container having a slot; and at least one protective panel which is capable of being stored in said container, said panel being movable through said slot from a stored position to a position at least partially covering said structural element;

wherein said at least one container comprises first and second containers which are adapted to be positioned on opposing sides of said structural element, said first container having a first slot along a side portion of said first container adjacent to said structural element and said second container having a second slot along a side portion of said second container adjacent to said structural element;

wherein said at least one protective panel comprises a plurality of first and second protective panels, said first container being capable of storing said first protective panels and said second container being capable of storing said second protective panels, said first protective panels being movable through said first slot so as to cover a first section of said structural element and said second protective panels being movable through said second slot so as to cover a second section of said structural element;

wherein each of said first and second protective panels is provided with flanges along its opposing side edges such that flanges on adjacent protective panels are capable of interconnecting with one another; and further including first and second front panels which are positioned respectively in said first and second containers, said front panels being visible through openings in said first and second containers and not passing through said first and second slots, said front panels engaging the outermost ones of said first and second protective panels in said first and second containers.

* * * * *